(No Model.)
G. M. COX.
TWO WHEELED VEHICLE.
No. 423,910. Patented Mar. 25, 1890.
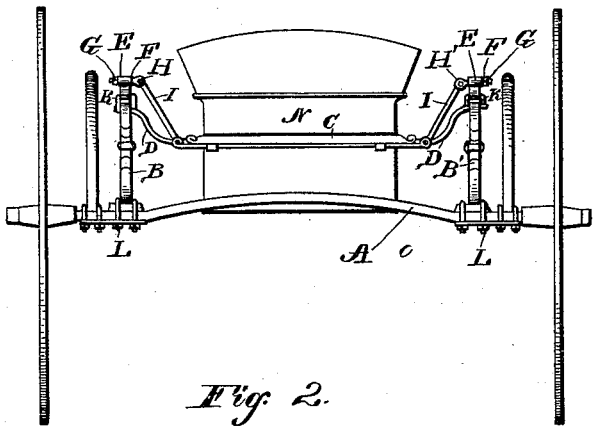
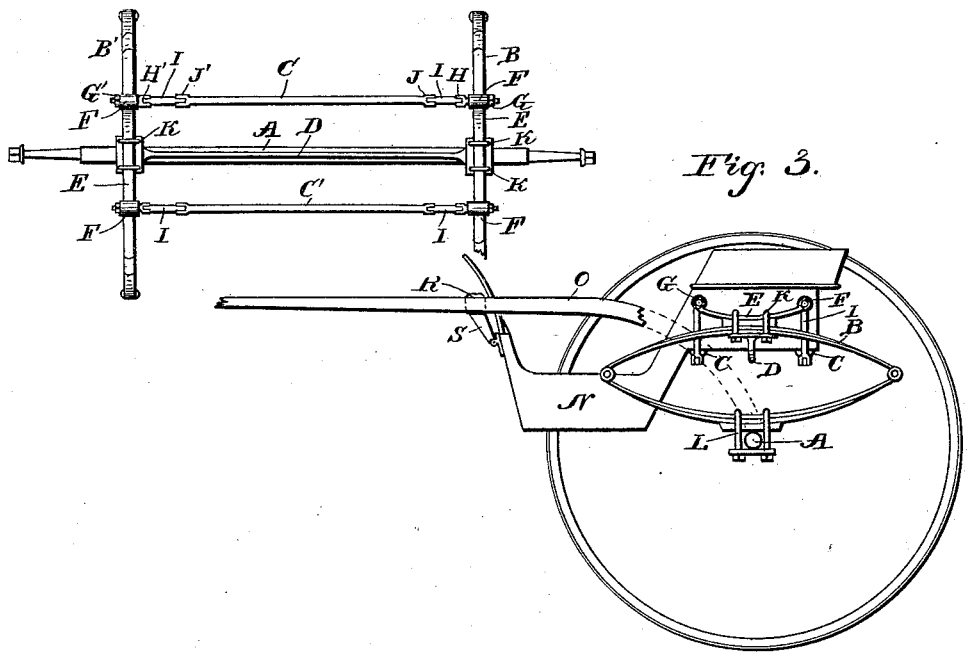
Witnesses
Percy C. Bowen
Wm. V. Moore
Inventor:
George M. Cox.
By Thomas E. Barra
Attorney.

UNITED STATES PATENT OFFICE.

GEORGE M. COX, OF MANSFIELD, OHIO, ASSIGNOR OF ONE-HALF TO JOHN C. TERMAN, OF SAME PLACE.

TWO-WHEELED VEHICLE.

SPECIFICATION forming part of Letters Patent No. 423,910, dated March 25, 1890.

Application filed October 5, 1889. Serial No. 326,108. (No model.)

*To all whom it may concern:*

Be it known that I, GEORGE M. COX, a citizen of the United States, residing at Mansfield, in the county of Richland and State of Ohio, have invented certain new and useful Improvements in Two-Wheeled Vehicles; and I do declare the following to be a full, clear, and exact description of the invention, such as will enable others skilled in the art to which it appertains to make and use the same.

My invention relates to improvements in two-wheeled vehicles; and the objects of my invention are, first, to provide a means to obviate all jerking movement caused by the motion of the horse, which is termed "horse motion;" second, to provide a two-wheeled vehicle that will be as easy in motion as a four-wheeled vehicle, at the same time to be durable and cheap in construction. I attain these objects by the mechanism illustrated in the accompanying drawings, in which—

Figure 1 is an end view of a two-wheeled vehicle, showing one view of my invention. Fig. 2 is a top view of the vehicle as it appears after the bed, wheels, and shafts are removed. Fig. 3 is a vertical side view showing the mode of attaching the springs, also their construction.

Similar letters refer to similar parts throughout the several views.

In the accompanying drawings, A indicates a single axle, upon which is mounted the elliptical springs B and B'. Said springs are secured to the axles by means of clips L. Secured upon the upper arch of the elliptic springs B and B' are the inverted curved bars E, said bars having eyes F formed upon each end, and in which is placed the hinged pivot-bolt H and held in position by the nut G, said bolt having a pivot movement in the eye E.

I indicates a link or hinged rod having hinges at each end.

C is a bar, which extends from one link to the one on the opposite sides, which makes a connection between springs B and B'. I place one of the said hinged connections in each end of the curved plate E, as shown in Fig. 2.

D is a brace, which extends from spring B to B'. The object of the said brace is for the purpose of retaining the springs in a perpendicular position. The said brace is secured to the inner arch of the upper portion of the springs B and B' by the clips K, which hold in position the inverted curved plate E, as shown in Figs. 1 and 2. The bed N is secured to the bars C and C', the bed resting upon the said bars, and is held in position by half-boxes secured on the under side of the bed. The front part of the bed is secured to the cross-bar R, which connect the shafts O together by means of straps S, but may be suspended by means of a connection having ball-joints. The bars C and C' can be constructed with ball-joints in the place of hinges. In that case the bar C could be flat and secured rigidly to the under side of the bed.

It will be readily seen that when the bed is secured in position, as shown in Figs. 1 and 3, the link or hinged connections allow the bed N to reciprocate in any direction, giving an easy motion to the bed and obviating all jerk motion common in all other two-wheeled vehicles now in use.

I do not wish to limit myself to the exact construction shown. Changes could be made which would not depart from the essence of the invention.

What I claim as new, and desire to secure by Letters Patent, is—

1. In a two-wheeled vehicle, the combination, with the axle and shafts, of a body, springs on each side of the body, flexible connections between the body and springs, flexible connections between the body and the shafts, and a brace-bar connecting the springs, substantially as described.

2. In a two-wheeled vehicle, the combination, with the axle, shafts, and body, of springs on each side of the body, a brace connecting the tops of the springs, and universal link-connections between the body and springs, substantially as described.

3. In a two-wheeled vehicle, the combination, with the axle, shafts, and body, of springs, one on each side of the body, a brace connecting the tops of the springs, the curved bars on the springs, the universal link-connections between the curved bars and the body, and the flexible connection between the body and the shafts, substantially as described.

In testimony whereof I affix my signature in the presence of two witnesses.

GEORGE M. COX.

Witnesses:
W. H. BOWERS,
T. F. BLACK.